United States Patent [19]

Bishop

[11] 3,709,673
[45] Jan. 9, 1973

[54] EDGE-ROLL MACHINE IN FLOAT GLASS APPARATUS

[75] Inventor: Hugh S. Bishop, Cumberland, Md.

[73] Assignee: PPG Industries, Inc., Pittsburgh, Pa.

[22] Filed: Nov. 25, 1970

[21] Appl. No.: 92,674

[52] U.S. Cl..................65/182 R, 29/129, 29/130, 65/91, 65/199
[51] Int. Cl.............................C03b 18/00
[58] Field of Search ..65/65 A, 91, 99 A, 182 R, 198, 65/199; 29/116 R, 129, 130

[56] References Cited

UNITED STATES PATENTS

| 3,481,727 | 12/1969 | Dickinson et al. | 65/65 A X |
|---|---|---|---|
| 3,492,109 | 1/1970 | Robinson et al. | 65/193 |
| 3,493,359 | 2/1970 | Lawrenson | 65/182 R |

Primary Examiner—Robert L. Lindsay, Jr.
Attorney—Chisholm and Spencer

[57] ABSTRACT

A roll for contacting the upper surface of float glass during its production is supported upon a shaft having, near the roll, a bearing in contact with water-cooled members. The shaft, unlike those in similar edge-roll machines, need not be made of costly material resistant to high temperatures, because it is internally water-cooled and its coolant water is used to cool internally the edge roll. Because of the small distance between the bearing and the roll, wobbling of the roll with respect to the ribbon of glass is minimal. Though the edge roll of the instant invention is applicable for use in one-way stretch of float glass to produce thin float glass, it is especially useful in a process that uses edge rolls that militate against the necking down of float glass in the production of extra-thin float glass (about 2.5 millimeters or less) in a "two-way-stretch" or an "assisted-direct-stretch" process.

10 Claims, 5 Drawing Figures

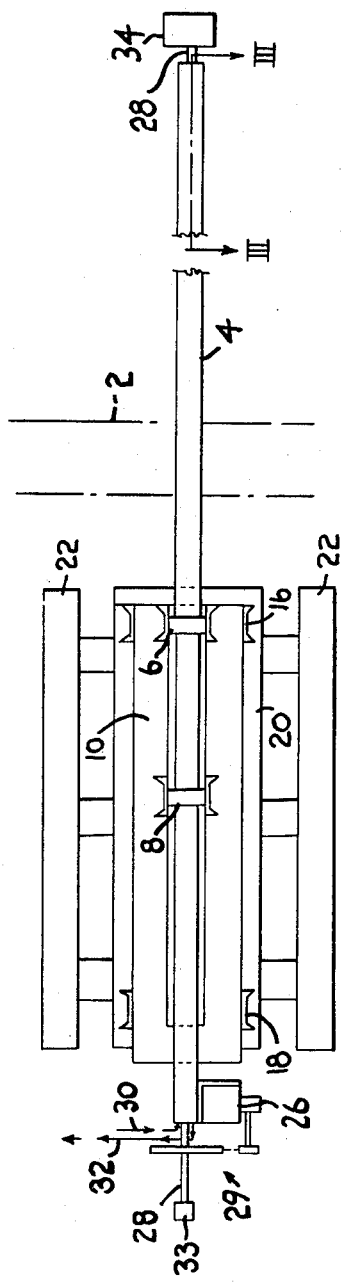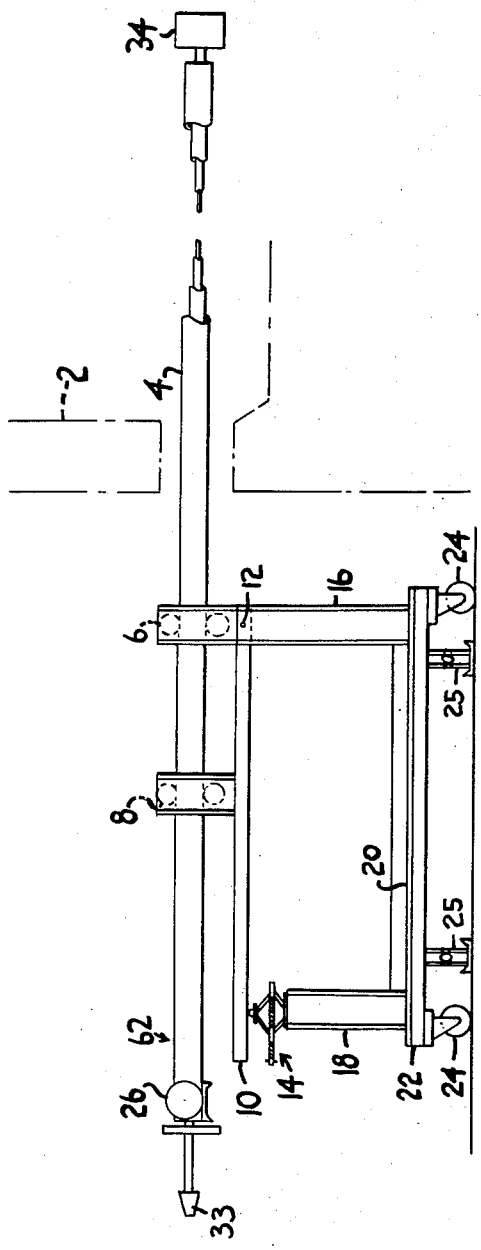
INVENTOR
HUGH S. BISHOP
BY Chisholm & Spencer
ATTORNEYS

INVENTOR
HUGH S. BISHOP

BY

ATTORNEYS

EDGE-ROLL MACHINE IN FLOAT GLASS APPARATUS

BACKGROUND OF THE INVENTION

1. Field of the Invention

This invention relates to apparatus for supporting edge rolls used in the production of thin or extra-thin float glass.

2. Description of the Prior Art

The most pertinent patents of which applicant is aware comprise U.S. Pat. Nos. 3,492,109 and 3,493,359.

Robinson et al. U.S. Pat. No. 3,492,109, issued Jan. 27, 1970, teaches the use of a glass-engaging edge roll that is supported at the end of a long shaft or barrel of "heat-resistant metal," mentioned in the patent as being of "heat-resistant steel." The patent contains, moreover, a teaching of "circulating a fluid, for example, water, through the central bore 6 of the roll barrel." At that, the material of which the barrel is made is expensive, and the patent does not contain any teaching of providing means that will perform satisfactorily under conditions of use and serve to prevent the end of the barrel containing the roll from wobbling in use.

Lawrenson U.S. Pat. No. 3,493,359 indicates locating such an edge roll upon a supporting axle that is supported within a bearing 13, shown in the patent as being supported by a bearing near the roll. The roll of the Lawrenson Patent is disclosed as being supported upon an axle that is interiorly water-cooled, but the patent fails to provide any teaching of a water-cooled bearing means for the portion of the axle proximate to the edge roll.

SUMMARY OF THE INVENTION

A light-weight and easily-constructed support for an edge roll or the one-way or two-way stretch production of thin float glass is obtained by using a structure produced along the lines indicated below. Into a small-diameter, stainless-steel tube, there are placed, at the center and ends, small bushings of suitable, lubricious heat-resistant material, with the bushings having a central bore through which there is passed the shaft, itself suitably internally water-cooled, upon which the edge roll is mounted. To the exterior of the stainless-steel tube mentioned above, there are affixed fins for directing cooling water or other suitable cooling fluid, and the stainless-steel tube mentioned above is encased within another stainless-steel tube of greater diameter, itself also internally cooled. The end of the shaft near the edge roll preferably bears a heat-shield member to protect the adjacent bushing. The end of the shaft remote from the edge roll is suitably driven by means of an electric motor or the like. This means that the edge roll is supported upon a shaft that is inexpensive but effective. The structure described is effective and strong, and it is light in weight and easily fabricated.

DESCRIPTION OF THE DRAWINGS

A complete understanding of the invention may be obtained from the foregoing and following description thereof, taken together with the appended drawings in which:

FIG. 1 is a plan view of apparatus in accordance with the instant invention;

FIG. 2 is an elevation view of apparatus in accordance with the instant invention;

DESCRIPTION OF THE PREFERRED EMBODIMENT

Figure 3:
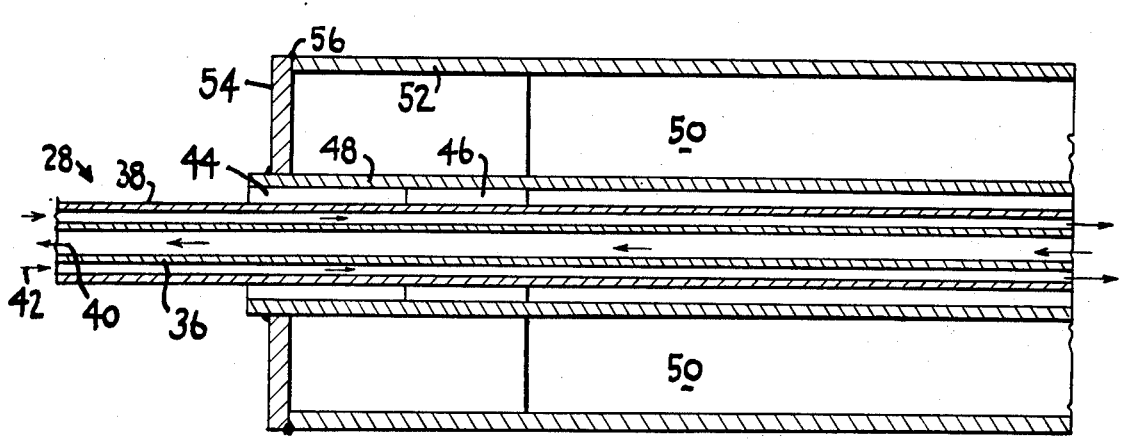
FIG. 3 is a sectional view taken on the line III—III in FIG. 1.

Referring now to FIGS. 1 and 2, there are shown a wall 2 of a float bath and the barrel 4 of an edge-roll machine protruding therethrough. The barrel 4 is rollingly supported by means of brackets 6 and 8, the bracket 8 resting on a table 10 that is pivoted as at 12 and being capable of being raised or lowered by means of a scissors jack indicated generally at 14. The table 10 and scissors jack 14 are supported on legs 16 and 18 respectively, which ride on the floor 20 of a carriage 22, supported upon suitable casters 24. Indicated at 25 are additional scissors-jack means, of which there are four, one for each of the casters 24. When the assembly has been rolled into place, the means 25 operate to raise it above floor level. Indicated at 26 is a motor, by means of which, as best seen in FIG. 1, a shaft 28 contained within the barrel 4 may be turned. FIG. 1 indicates a suitable chain and sprocket or timing belt drive for the shaft at 29. Also indicated in FIG. 1 by means of the arrows 30, 32 are water-flow lines, the operative relationship of which with the remaining parts of the equipment will be apparent from the description contained hereinbelow. Item 33 is a rotary union, by means of which water or gas is fed for cooling purposes. The edge roll 34 is provided, for contacting the molten glass. It may be of the form indicated in U.S. Pat. No. 3,493,359, or constitute any suitable equivalent or modification thereof.

The manner of constructing the edge-roll machine will be apparent from a consideration of FIG. 3, wherein the shaft 28 is shown as comprising a pair of tubes 36, 38 that are preferably, but perhaps not necessarily of stainless steel or the like.

The shaft 28 comprises an inner cylindrical part 36 and an outer cylindrical part 38, such as to permit the passage of suitable cooling fluid, almost surely a liquid such as water (but air cooling is not to be ruled out entirely), as indicated by the arrows 40 and 42. This implies that the parts 36 and 38 are kept spaced from each other, by suitable means, not shown. Between the part 38 of shaft 28 and the remainder of the structure comprising the present invention there is provided a sleeve 44, which may be of any suitable material such as stainless steel. Sleeve 44 serves as a heat shield to protect the bushing 46 mentioned below. Aligned with the sleeve 44 is a toroidal bushing 46, which may be made of lubricious, heat-resistant material, such as "Graphalloy" or the like. "Graphalloy" is a trade name for a bushing made of graphite with its pores impregnated with metal (babbitt, copper, bronze, etc). Such a bushing is self-lubricating and resistant to high temperature. Any bushing that is self-lubricating and able to withstand 200° F. should perform satisfactorily. Fitting over the bushing 46 is a further tube 48, also of stainless steel or the like, to which there are affixed fins as indicated at 50. The orientation of the fins 50 is not critical. Other bushings, likewise made of lubricious heat-resistant material, are provided between tube 48 and part 38, for example, near the center and near the end 62 of barrel 4 that is remote from the edge roll 34. Completing the structure are an exterior tube 52, likewise of heat-resistant metal such as stainless steel, and an end cap 54, joined to the tube 52 by suitable means such as welding, as indicated at 56.

Figure 4:
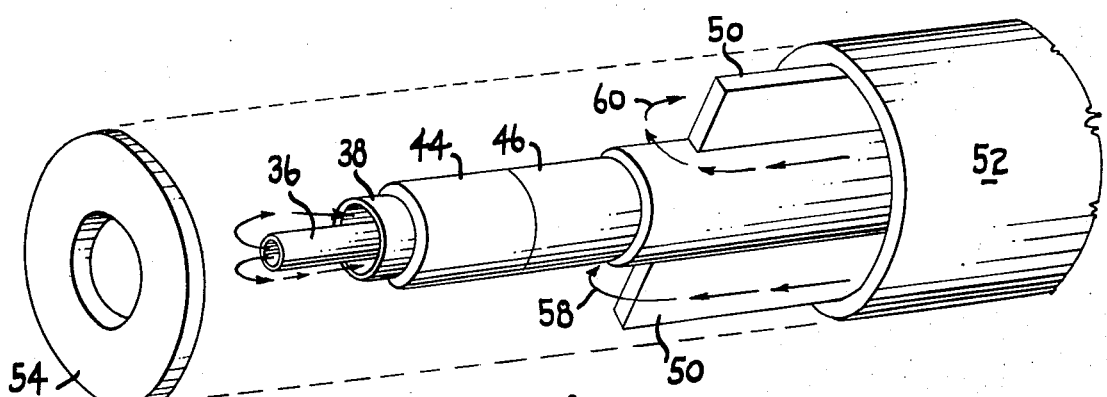
FIG. 4 is an exploded perspective view of apparatus shown in FIG. 3.

The flows of cooling fluid in the annular space between the tubes 48 and 52 are accurately indicated in FIG. 4 by the arrows 58 and 60.

Figure 5:
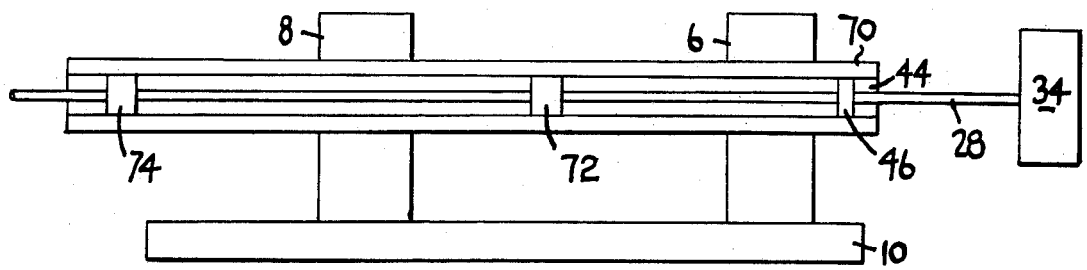
FIG. 5 is a schematic diagram used in further explaining the invention.

Reviewing the invention, with reference to FIG. 5, the edge roll 34 is turned with the shaft 28, which is itself internally fluid-cooled. The shaft 28 is spaced from a tubular member 70, itself internally fluid-cooled (comprising tubes 48 and 52 and fins 50 as described above), that remains stationary, held in supports 8 and 6 connected to the table 10 of carriage 22. Shaft 28 is spaced from member 70 by means of toroidal bushings of lubricious heat-resistant material, i.e., the bushing 46 mentioned above and other similar bushings 72 and 74. A sleeve 44 serves as a heat shield, protecting the hot-end bushing 46 from the heat of the glass. The coolant circulating in the shaft 28 is preferably also used to cool the roll 34.

With a structure as indicated above, it becomes possible to construct an edge-roll machine from relatively inexpensive materials that are readily available and comparatively easily machined. For example, the parts 36 and 38 and the tubes 48 and 52 may be made from stainless-steel pipe stock, without need for casting or machining of expensive high-performance, heat-resistant material, such as nickel-cobalt-base superalloy. Savings in weight also result.

For rigidity adequate to prevent substantial wobbling of an edge roll 34 about 6 inches in diameter, I have used parts made of the materials and having the dimensions indicated below:

Tube 52 — 15 feet long, AISI Type 410 stainless steel, 4½ inches O.D., wall thickness 0.237 inch.

Tube 48 — AISI Type 410 stainless steel, 1.66 inches O.D., wall thickness 0.191 inch.

Part 38 — 16 feet long, AISI Type 304-L stainless steel, 1 1/16 inches O.D., wall thickness 0.156 inch.

Part 36 — 16.5 feet long, AISI Type 304-L stainless steel, seventeen thirty-seconds inch O.D., wall thickness 0.083 inch.

Since barrel 4 is rollingly supported for in-and-out movement on supports 6 and 8, the distance from support 6 to edge roll 34 can be anything from 2¼ inches to 12 feet.

It is considered an important feature of the invention that the tubes 36 and 38, which comprise the shaft 28 and support the roll 34, turn together, but the exterior structure (tubes 48 and 52) is substantially a stationary one. This means, as can be seen from FIG. 2, that the shaft 28 has firm and stationary support that can extend into the float bath and be, for example, only a very short distance from the edge roll 34, instead of having a structure of the kind hitherto used, wherein the edge roll is supported only by a member that lies outside the float bath, with the edge roll thus having support from a relatively long cantilever arm that tends to permit it to wobble in use.

The following additional teachings will assist those skilled in the art in arriving at a proper and thorough understanding of how the invention may be practiced, and the advantages that are to be obtained thereby.

The tubes 48 and 52 may, if desired, be constructed of black iron pipe, which is considerably less costly than stainless steel. Black iron is not manufactured to dimensional tolerances as close as those for commercial stainless-steel pipe, and as a result, there may in some instances be difficulty in obtaining a proper circulation of cooling water in the space between the tubes 48 and 52, because of the failure of the fins 50 to fit accurately against the walls of the tubes. This difficulty may in many instances be overcome by such measures as affixing sealing material to the edges of the fins 50, including a seal-forming agent in the circulating water, or simply using a cooling-water flow that is large enough that the desired cooling effect is obtained at the hot end of the tubes 48 and 52, despite the occurrence of any short-circuiting flows that occur because of poor fit between the fins 50 and the tubes 48 and 52 which encompass them.

In some instances, satisfactory results have been obtained when the toroidal bushings of lubricious, heat-resistant material are made of graphitized bronze, or simply of bronze of the kind that is ordinarily used for bushings.

Those skilled in the art are generally aware that existing commercial float baths have a width internally that is on the order of 15 to 27 feet, with the glass ribbon that is being produced having a width on the order of 8 to 12 feet. In such circumstances, the specifications indicated above for barrel material, barrel length, and distance from support affixed to edge roll 34 will in most instances prove satisfactory. At times, with the barrel 4 extended fully into the furnace, it may prove desirable to provide some sort of counterweight to exert a suitable downward force on the end of it that is outside the furnace. An alternative is simply to make the barrel 4 have a greater overall length, but this proves cumbersome when the barrel is fully retracted from the furnace because of the greater space required and the tendency to need, if such a longer barrel is used, means to prevent the barrel from overbalancing in the other direction when it is so retracted. The use of a telescoping barrel to overcome these problems is to be ruled out.

Stainless-steel pipe or black-iron pipe of the general dimensions indicated above prove satisfactory for installations having the general dimensions indicated above, but it is envisioned that thicker-walled pipe or pipe provided with strengthening means such as ribs or other suitable reinforcement or pipe of strengthened material would be used in installations where the float bath is wider and/or the glass ribbon that is operated on is narrower. An important consideration is that the tubes 48 and 52 should be of such dimensions as not to buckle under their own weight when inserted into the float bath since this would cause the bushings to become cocked and the rotating interior shaft 28 to bind.

The distance from the center of the edge roll 34 to the point at which it is supported by bearing 46, in the practice of the instant invention, is ordinarily about 3 to 8 inches, although it may be as little as 1.5 inches or in some instances as much as about 14 inches. It should be noted that this distance remains substantially the same, regardless of how far it is necessary to cause the tubes 48 and 52 to protrude into the furnace; this means that the edge roll 34 is in all cases provided with good support against wobbling. In this point, the invention differs substantially from the prior art of which the applicant is aware. The above discussion holds good for an interior tube 28 of the wall thickness and the material mentioned above. With the use of thicker or stronger material for the tubes 38 and 36, the distance from bearing to center of roll 34 may in some cases be as great as 18 inches, again with at least one of the bearings being located withing the float bath when the machine is in use and close enough to permit the roll 34 to be turned without wobbling substantially.

The invention was originally conceived as being useful in a practice for making extra-thin float glass (about 2.5 millimeters or less in thickness) in a "two-way-stretch" process, by inserting a plurality of edge-roll machines designed in accordance with the instant invention into the float bath through the appropriate ones of the side-seal openings thereof. The side-seal openings are about 7½ inches high or a little less, and this provides a limit on the dimensions of the glass-contacting rolls 34 and supporting structure for them that can thus be inserted. In the "two-way-stretch" process, it was considered that there would be used to attenuate the ribbon longitudinally thereof the forces generated between the annealing-lehr rolls and the prior-art edge rolls that grasp the glass, top and bottom, in a portion of the float bath near the end where the molten glass enters it, with the rolls 34 of the apparatus disclosed in accordance with the instant invention being then used as needed to prevent the glass ribbon from necking down to an undesirable extent as the result of the above-mentioned longitudinal attenuation. In other words, the machines designed in accordance with the instant invention were originally conceived of as being useful for providing the stretch in the second way, transversely of the ribbon, in a "two-way-stretch" process. It now appears, however, that the structure of the instant invention may be even more useful than it was originally thought.

Those skilled in the art of making float glass of sub-equilibrium thickness (less than about 6 millimeters) have come by this time to an appreciation that there are substantial technical problems connected with obtaining thin float glass by a process wherein a pair of edge rolls, above and below the glass, are used to oppose the annealing-lehr force. The pair of such rolls must be inserted, in most events, through a side-seal opening of the dimensions mentioned above. The problems of making such a pair of rolls and their supporting means so that they will exhibit in the service a satisfactory rigidity, not tending in service to warp out of shape and come into contact with the glass eccentrically or irregularly, is a severe one. It tends to call for the use of means that are carefully constructed from expensive materials, quite resistant to the high-service temperatures involved and of remarkable high-temperature strength. In work aimed at developing a suitable method for making windshield-quality, extra-thin float glass by a "two-way-stretch" method as indicated above, there have been developed in accordance with the prior art other and less advantageous forms of equipment for bringing an edge roll, such as the edge roll 34 of the present invention, into contact with the top side only of the float ribbon, and after these were developed and some use of them had begun, it became known that it is possible, in some circumstances, without the use of the pair of edge rolls that operate on the top and the bottom of the glass ribbon, while using instead only the edge rolls that correspond to my edge rolls 34, to produce thin float glass in accordance with the method that may be called "assisted-direct-stretch" in contrast to "two-way-stretch." If the annealing-lehr roll force is great enough, the desired degree of reduction in ribbon thickness can be obtained by a direct stretch, and all that is required at the same time then, so far as concerns the problem of obtaining a product glass ribbon of the desired thickness and width is concerned, is to prevent, to the extent necessary, the increased tendency to "necking down" that is caused by the use of the somewhat greater annealing-lehr forces, and thus it has been found that in accordance with the "assisted-direct-stretch" approach to the production of thin float glass, the top-side only rolls, whether they be of the prior-art construction or (more advantageously) of the construction disclosed in the instant application, will serve the purpose. The ultimate problem, it must be understood, is to obtain not only a ribbon of the desired general thickness and width but also one that is of windshield quality or better as respects its freedom from distortion, and to do so at the lowest possible plant cost for capital equipment and operating expense. Of course, there are various other factors that enter into the problem of obtaining thin or extra-thin float glass that is sufficiently free of the distortion as to be salable for particular uses, such as mirrors or windshields. A discussion of the other factors that enter into the production of extra-thin float glass of windshield quality or better is beyond the scope of this patent application. This is important: the equipment disclosed in this application for supporting and manipulating edge rolls that contact the top side only of the float glass will find use, in place of the considerably more costly and complicated prior-art equipment for the same purpose, in the "assisted-direct-stretch" method of producing thin or extra-thin float glass, and thus the equipment of the instant invention aids in bringing to the float-glass technology the practical capability of practicing the "assisted-direct-stretch" mode.

The equipment of the instant invention, when used to implement the commercial realization of the "assisted-direct-stretch" technology, as opposed to the use of edge rolls grasping the ribbon, top and bottom, is clearly an important advance in the art. To speak conservatively, a set of eight edge-roll machines made in accordance with the instant invention will cost less than one-tenth as much as one complete set (two pairs, for top and bottom of the ribbon, each side) used for longitudinal attenuation in the "two-way-stretch" process. Moreover, the float-glass art appears to be moving in the direction of adopting the "assisted-direct-stretch" practice, since it has not been possible, without using a few pairs of sets of edge-roll machines to retard the necking down of the glass ribbon, to produce (except perhaps sporadically) float glass of windshield quality by United States standards that has a thickness less than about one-eight inch. In other words, to get satisfactory extra-thin float glass, it is essential (among other things) to have a plurality of pairs of edge rolls like the rolls 34, and once that they are provided, the float process can be operated in the "assisted-direct-stretch" mode, making the set of pairs of expensive top-and-bottom rolls unnecessary, and it has been the relatively high cost of the structures hitherto used in place of the equipment of the instant invention that has, before this invention, imposed a formidable obstacle to the practical and commercial realization of the economies obtainable with "assisted-direct-stretch" float-glass production.

The supporting equipment is preferably, but not necessarily, of such nature that the barrel 4 may have its position adjusted conveniently, not only with respect to its distance into or out of the float-bath structure (though it is intended when the instant invention is in use that the bushing nearest to the edge roll 34 lies within the float-bath structure) and up and down (scissors-jack means 14) but also angularly about a vertically extending pivot, not shown, so that a relatively fine adjustment of the angle at which the edge roll 34 addresses the edges of the ribbon of float glass may be obtained, without turning the structure indicated in FIG. 2 bodily upon the casters 24. Those skilled in the art will readily perceive how the structure shown in FIG. 2 may be modified to effect this result, which forms a part of the best mode of practicing the invention but is not essential to the invention in its broader aspects.

I claim as my invention:

1. In apparatus for supporting an edge roll within a float-bath structure in the float process for manufacturing flat glass, the combination comprising,
   a first tubular and internally fluid-cooled member of heat-resistant material, said member being adapted at a first end thereof to support an edge roll and at a second and opposite end thereof to be turned,
   an edge roll supported by said first member,
   a second tubular and internally fluid-cooled member, said second member being in the form of a sleeve surrounding said first member and providing a fluid-cooled bearing therefor,
   a plurality of bushings of lubricious, heat-resisting material spaced from one another at locations along and about the periphery of said first tubular member, at least one of said bushings being located within said float-bath structure and spaced from the center of said edge roll by a distance of about 1 to 18 inches, and
   means supporting said second member.

2. A combination as defined in claim 1, characterized in that a heat-shield means is affixed to said second tubular member in an end thereof corresponding to said first end of said first tubular member.

3. A combination as defined in claim 2, further characterized in that said means supporting said second member comprise a carriage having caster means and a table pivotally connected thereto, and
   means for adjusting the pivotal position of said table with respect to said carriage.

4. A combination as defined in claim 3, characterized in that said means for adjusting the pivotal position of said table with respect to said carriage comprises a scissors-jack means.

5. A combination as defined in claim 3, further characterized in that said combination comprises motor means on said table operatively connected to said first member.

6. A combination as defined in claim 1, further characterized in that said combination comprises coolant-fluid supply means operatively connected to said first member and to said second member.

7. A combination as defined in claim 6, characterized in that a heat-shield means is affixed to said second tubular member in an end thereof corresponding to said first end of said first tubular member.

8. A combination as defined in claim 6, characterized in that said means supporting said second member comprises a carriage having caster means and a table pivotally connected thereto, and
   means for adjusting the pivotal position of said table with respect to said carriage.

9. A combination as defined in claim 8 characterized in that a heat-shield means is affixed to said second tubular member in an end thereof corresponding to said first end of said first tubular member.

10. Apparatus as defined in claim 8, characterized in that said means for adjusting the pivotal position of said table with respect to said carriage comprises a scissors-jack means.

* * * * *